Dec. 1, 1970   O. FREUDENSCHUSZ   3,544,206
FILM-FEEDING MECHANISM FOR CARTRIDGE-LOADED
MOTION PICTURE APPARATUS
Filed May 15, 1968   2 Sheets-Sheet 1

Inventor:
Otto Freudenschusz

Dec. 1, 1970  O. FREUDENSCHUSZ  3,544,206
FILM-FEEDING MECHANISM FOR CARTRIDGE-LOADED
MOTION PICTURE APPARATUS
Filed May 15, 1968  2 Sheets-Sheet 2
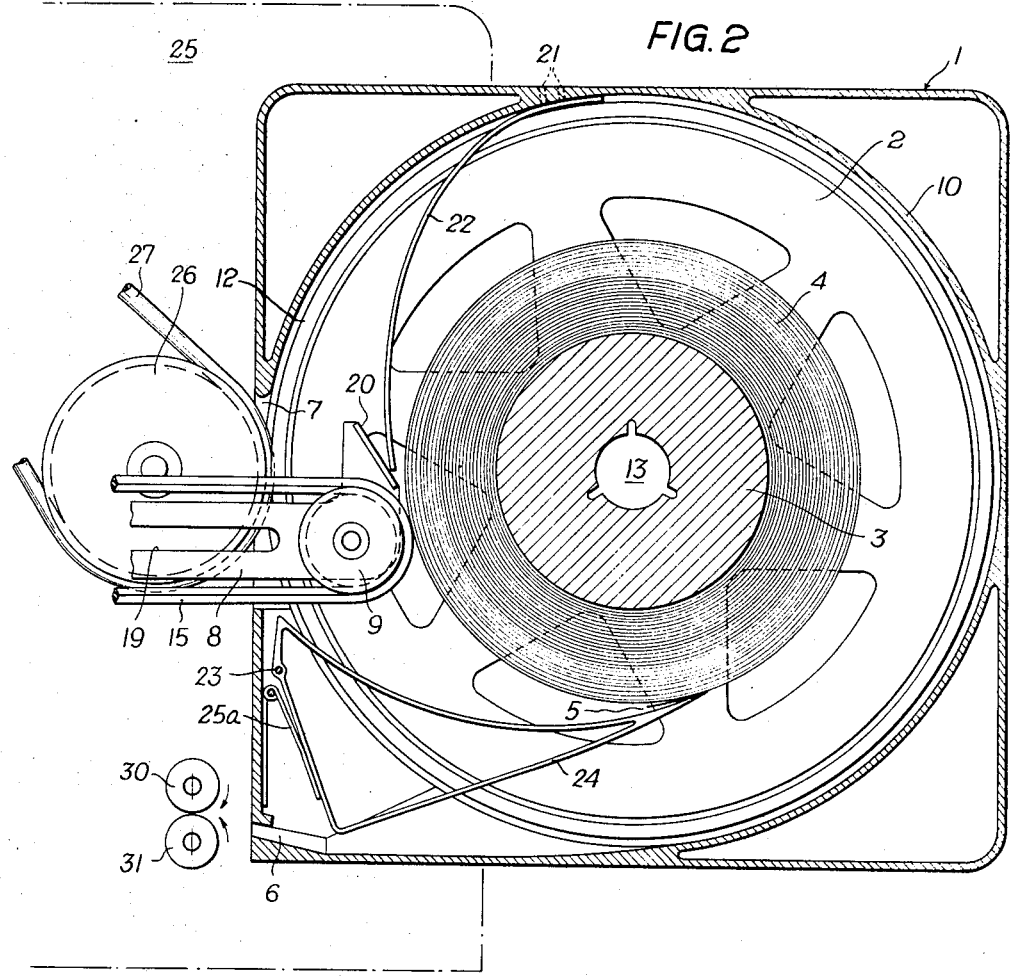
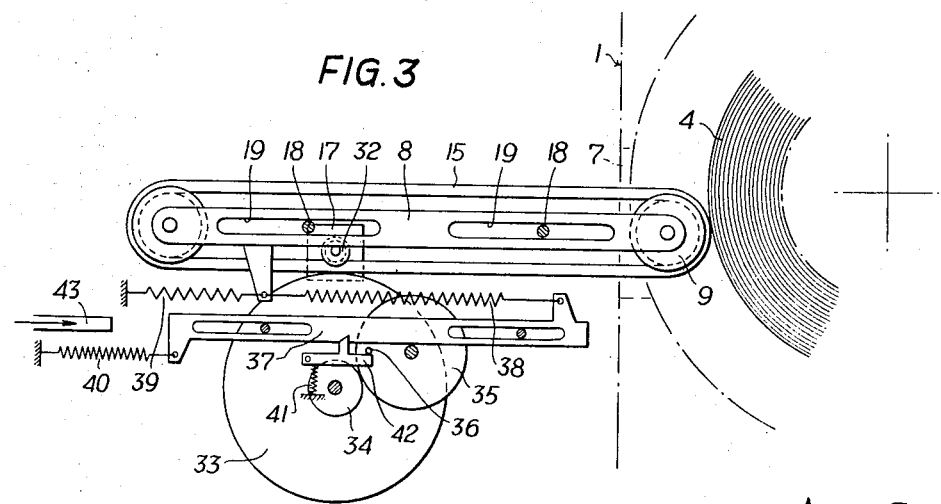

United States Patent Office 3,544,206
Patented Dec. 1, 1970

3,544,206
FILM-FEEDING MECHANISM FOR CARTRIDGE-LOADED MOTION PICTURE APPARATUS
Otto Freudenschusz, Vienna, Austria, assignor to Karl Vockenhuber and Raimund Hauser, both of Vienna, Austria
Filed May 15, 1968, Ser. No. 729,226
Claims priority, application Austria, May 16, 1967,
A 4,585/67
Int. Cl. G03b 1/56
U.S. Cl. 352—72                    5 Claims

ABSTRACT OF THE DISCLOSURE

A belt-driven friction roller mounted on a horizontally-sliding bar feeds film from a cartridge. It enters a side opening in the cartridge and contacts the coil of film, driving the coil a sufficient amount to allow the leading film end to emerge from the cartridge. A mechanical interrupting arrangement shuts off the drive for the belt after the coil has turned enough for the film end to emerge.

---

The invention relates to a cinematographic apparatus for film cartridges, in which a roller is pressed to the exterior circumference of the film coil for pushing the leading end of the film out of the outlet opening of the cartridge. The roller is indirectly driven by the film coil operated by the core of the reel or it is directly driven, the cinematographic equipment being further provided with a transport device for the film.

In the equipment described above disturbances may occur in guiding the film end out of the cartridge, when the leading film end is damaged, for instance, cracked or broken. In this case the film forms loops in the interior of the cartridge. As a further consequence a stow of the film material occurs leading finally to damage of the film. This defect could be eliminated by stopping the drive in time and by rewinding the film. Since, however, this disturbance can not be recognized, either on the equipment, or on the cartridge, a timely stop of the drive will not take place.

It is an object of the present invention to solve this problem by a stopping means for the drive, specifically the core of the reel, which becomes effective in dependence on the number of revolutions of the roller, and the core of the reel, respectively which number of revolutions substantially corresponds to the maximum path the leading film end may have to pass from the beginning of the threading operation inside to the outside of the cartridge until it is seized by the transport device.

With these and other objects in view, which will become apparent in the following detailed description, the present invention will be clearly understood in connection with the accompanying drawings, in which:

FIG. 2 is a cross section of the cartridge and illustrates the parts of the projector cooperating directly with the cartridge; and FIG. 3 is an elevational view of the shiftable support member and its corresponding control means with a portion of the reel coil indicated.

Figure 1:
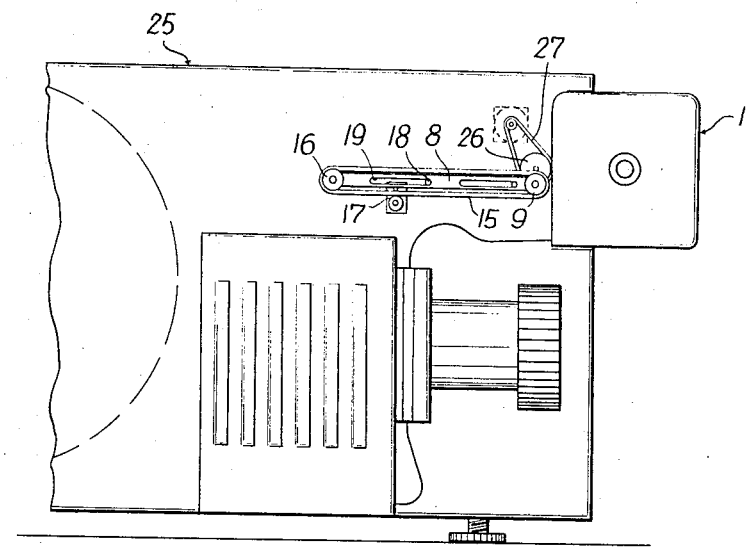
FIG. 1 is a side elevational view of a projector, partly broken away, with a device to push the leading end of the film out of the cartridge.

Referring now to the drawings, a cartridge housing 1 has inside a supply reel 2 pivotally arranged, the latter being provided with a film coil 4 disposed on the core of the reel 3. Upon using the cartridge in cinematographic reproducing equipment it is necessary to push the leading film end 5, which may have any position on the film coil, through an outlet opening 6 out of the cartridge. For that purpose a support member 8 is inserted into the cartridge through an opening 7 in the cartridge wall bearing on its front portion a friction roller 9. The friction roller 9 is received between the flanges of the reel 2 and operatively contacts the film coil by means of a belt 15 against the film coil. The belt preferably made of rubber at the same time establishes the drive connection. By the roller 9 rotating in counterclockwise sense the leading end of the film is moved in a more or less curved path in clockwise sense towards the outlet opening 6 of the cartridge, whereby the leading film end 5 generally abuts the inner cylindrical cartridge wall 10. The support member 8 is shiftable in a longitudinal direction and guided by bolts 18, connected with the housing and operatively engaging in longitudinal slots 19 of the support member 8. The front portion of the support member 8 is L-shaped and bears an oblique guiding surface 20. Upon inserting the support member into the cartridge, the guiding surface 20 encounters a leaf spring 22, which is fastened to the inner cylindrical wall 10 of the cartridge by means of rivets 21 and abuts the inner cylindrical cartridge wall in its rest position. By inserting the support member, the leaf spring 22 is deviated between the flanges of the reel 2, so that a smooth runway for the leading film end 5 results thereof, which has no bending point which could cause a buckling of the film. In the cartridge a stripper lever 24 is pivotally arranged on an axis 23 and is pressed to the circumference of the film coil by means of a spring 25a. By an adequate formation of the front portion of the stripper lever 24 it is guaranteed that it abuts only the range of the perforation of the film, so that damage to the pictures is avoided.

A friction wheel 12 is rotatably arranged in the cartridge 1, which has a central pin upon which the film reel 2 is slipped. For rewinding the film into the cartridge, a roller 26 is suitably provided in the projector 25, the roller 26 being driven by a motor, not illustrated, by means of a belt 27, and being adapted to rotate the friction wheel 12.

Opposite the outlet opening 6 of the cartridge two transport rollers 30 and 31 are provided. The roller 30 turns in clockwise sense, the roller 31 in counterclockwise sense. The two transport rollers have the task to seize the leading film end 5 leaving the cartridge and to guide it to the film transport device, not illustrated, of the equipment.

The drive of the belt 15 and therewith of the roller 9 is effected by the motor 17, which in a manner not illustrated in the drawing is pivotally arranged. A roller 32 disposed on the motor shaft presses the belt 15 against a disk 33, rotatably mounted in stationary bearings. A pinion 34 is arranged coaxially to the disk 33 and mates with a gear wheel 35 bearing a pin 36, which is parallel to its axis. For the control of the support member 8, a slider 37 displaceable parallel to the latter, is provided, which is like-wise guided by bolts running in longitudinal slots. The support member 8 is connected with the slider 37 by a tension spring 38 and on the other hand stands under the action of a spring 39, which biases the support member toward its left end position. In the same manner a spring 40 is provided acting on the slider 37, which biases the same in its rest position. The slider 37 is secured in its operating position by a latch 42 charged by a spring 41 and engaging a corresponding recess on the slider 37. The disk 33, pinion 34, gear wheel 35, and pin 36 comprise a counter means. The latch 42, spring 41 and slide 37 constitute an interrupting means for operatively disengaging the drive motor 17 from driving connection with the film coil 4. The interrupting means may also include the disk 33, pinion 34, gear wheel 35 and pin 36, as well.

The mode of operation of the novel device is the following: After inserting the cartridge 1 into the film projector, the slider 37 is displaced by means of a stamp 43 from its left end position to its operating position, in which it is held by the latch 42. The spring 38 also pulls the support member 8 to the right and presses the roller 9 to the film coil 4. By switching on the drive motor, the roller 9 is operated in the counter-clockwise direction, whereby the leading end of the film 5 is moved in the cartridge in the clockwise direction towards the outlet opening of cartridge 6. The leading film end 5 has to travel a maximum path, if, upon starting the threading operation, it is positioned under the end portion of the stripper level 24 (as shown in FIG. 2). The film is first moved by the rotating coil to the friction roller 9, is seized by the latter, respectively by the belt 15 and led through the space between the friction roller 9 and the film coil 4. The leading film end 5 is further moved along the leaf spring 22, the inner cylinder wall 10, the lower side of the stripper lever 24, sequentially, and then to the outlet opening of the cartridge 6. The film leaving the outlet opening 6 of the cartridge is seized by the rollers 30 and 31 and guided to the film transport device. Simultaneously with the leading film end 5, also the gear wheel 35 is operated by means of the step-down gearing 33, 34. After a certain number of revolutions of the belt 15 and the roller 9 respectively, corresponding to the maximum path for the leading film and to pass until it arrives at the rollers 30 and 31, to be threaded there between, the pin 36 encounters the latch 42 and removes it out of the corresponding recess of the slider 37, so that the slider 37 and the support member return to their left end positions under the action of their return springs 39 and 40.

If a film loop is formed in the cartridge as a consequence of a cracked or broken leading film end, damage of the film can reliably be avoided by the limitation of the drive.

In an advantageous embodiment of the invention, the drive for the friction roller is simultaneously interrupted with the replacement of the support member 8.

It is also possible to construct the friction roller without special drive. In this case the reel 2 is deviated in clockwise sense during the threading operation by the friction wheels 26 and 12, whereby the friction roller 9 is operated by the film coil. Here the friction roller 26 is stopped in analogous way as described in the above embodiment after a certain number of revolutions.

The invention is not restricted to cinematographic projectors but may also be applied with the same advantages for instance to film cameras and sound tape instruments.

While I have disclosed one embodiment of the present invention, it is to be understood that this embodiment is given by example only and not in a limiting sense.

We claim:
1. In a cinematographic apparatus adapted to be loaded with film cartridges, the latter having a side wall,
   a supply reel arranged within one of said film cartridges and having a film coil, said side wall of said film cartridge having an opening,
   a support means having a front portion and a rear portion and being adapted to pass through said opening,
   rotatable friction roller means provided on said front portion of said support means and being adapted to feed the film out of said cartridge,
   an adjusting means adapted to move said support means from a rest position, in which said friction roller means is outside said cartridge, to an operating position, in which said friction roller means is inserted into said cartridge and operatively abuts said film coil,
   means for driving said friction roller means at least in said operating position of said support means,
   interrupting means for operatively interrupting said driving means,
   counter means counting the film length being fed out of said cartridge, and
   said counter means controlling said interrupting means to interrupt said driving means after a predetermined length of film has been fed.

2. In a cinematographic apparatus adapted to be loaded with film cartridges, the latter having a side wall
   a supply reel arranged within said film cartridge, and bearing a film coil,
   said side wall of said film cartridge having an opening,
   a support means having a front portion and a rear portion and being adapted to pass through said opening,
   rotatable friction roller means provided on said front portion of said support means and being adapted to feed said film of said cartridge,
   an adjusting means adapted to move said support means from a rest position, in which said friction roller means is outside said cartridge, to an operating position, in which said friction roller means is inserted into said cartridge and abuts said film coil,
   means for driving said friction roller means at least in said operating position of said support means,
   interrupting means for operatively interrupting said driving means,
   said roller means, said supply reel and said driving means constituting revolving parts,
   counter means countings the revolutions of one of said revolving parts, and
   said counter means controlling said interrupting means to interrupt said driving means after a predetermined number of revolutions.

3. In a cinematographic apparatus, as set forth in claim 2, wherein
   said predetermined number of revolutions is equal to the number of revolutions necessary to push the leading end of the film, starting from a position in which the path to be covered by said leading end of the film attains a maximum value, to a position in which said leading end of the film is able to be threaded.

4. In a cinematographic apparatus adapted to be loaded with film cartridges,
   a supply reel arranged with said film cartridge,
   an opening in a side wall of said film cartridge,
   a support means having a front portion and a rear portion and being adapted to pass through said opening,
   rotatable friction roller means provided on said front portion of said support means and being adapted to drive said supply reel,
   driving means driving said roller means,
   an adjusting means adapted to move said support means from a rest position, in which said friction roller means is outside said cartridge, to an operating position, in which said friction roller means is inserted into said cartridge and operatively abuts said supply reel,
   film feeding means,
   interrupting means for operatively interrupting said driving means,
   said means being controlled in dependence on the length film driven by said friction roller means interrupting the drive of the film, when a predetermined length of film has been driven by said friction roller means,
   a slider movably arranged on said equipment,
   first spring means being on the one hand fixed on said slider, on the other hand acting on said support means, urging the latter to its operating position,
   second spring means being on the one hand fixed on said apparatus, on the other hand acting on said support means, urging the latter to its rest position, and
   said slider being movable to an operating position, in which the force of the first spring means overcomes the force of the second spring means, so that the support means is moved to its operating position and the friction roller pressed to the film reel.

5. The cinematographic apparatus as set forth in claim 4, further comprising
   third spring means attempting to withdraw said slider from its operating position,
   latch means releasably locking said slider in its operating position against the action of said third spring means, and
   releasing means for said latch means being controlled by said driving means.

References Cited
UNITED STATES PATENTS

| | | | |
|---|---|---|---|
| 2,891,736 | 6/1959 | Blaes | 352—157 X |
| 3,442,580 | 5/1969 | Winkler | 352—72 X |

JOHN M. HORAN, Primary Examiner

K. C. HUTCHISON, Assistant Examiner

U.S. Cl. X.R.
352—78; 158